US011920365B2

(12) United States Patent
Schwartz et al.

(10) Patent No.: US 11,920,365 B2
(45) Date of Patent: Mar. 5, 2024

(54) MODULAR PARTITION TRACK SYSTEM

(71) Applicants: Joseph Schwartz, Hollywood, FL (US); Gunter Felix, Hialeah, FL (US); Daniel Gittler, Hollywood, FL (US)

(72) Inventors: Joseph Schwartz, Hollywood, FL (US); Gunter Felix, Hialeah, FL (US); Daniel Gittler, Hollywood, FL (US)

( * ) Notice: Subject to any disclaimer, the term of this patent is extended or adjusted under 35 U.S.C. 154(b) by 343 days.

(21) Appl. No.: 17/220,174

(22) Filed: Apr. 1, 2021

(65) Prior Publication Data

US 2022/0316233 A1 Oct. 6, 2022

(51) Int. Cl.

| | |
|---|---|
| ***E04H 17/18*** | (2006.01) |
| ***E04H 17/00*** | (2006.01) |
| ***F21S 9/03*** | (2006.01) |
| ***F21V 23/00*** | (2015.01) |
| ***F21W 131/10*** | (2006.01) |

(52) U.S. Cl.

CPC ........... *E04H 17/18* (2013.01); *E04H 17/009* (2021.01); *E04H 17/017* (2021.01); *F21S 9/037* (2013.01); *F21V 23/002* (2013.01); *F21W 2131/10* (2013.01)

(58) Field of Classification Search

CPC .......... E04B 2/74; E04B 2/7425; E04B 2/827; E04H 17/009; E04H 17/22; E04H 17/18; E04H 17/185

USPC ........................................................... 52/243

See application file for complete search history.

(56) References Cited

U.S. PATENT DOCUMENTS

| | | | | |
|---|---|---|---|---|
| 4,221,255 A * | 9/1980 | Barkemeyer | E06B 3/922 | 160/197 |
| 4,410,157 A * | 10/1983 | Monti | F21V 21/34 | 403/3 |
| 4,723,374 A | 2/1988 | Peterson et al. | | |
| 4,887,691 A | 12/1989 | Rotondo | | |
| 5,016,318 A * | 5/1991 | Harris | E05D 15/0608 | 160/206 |
| 5,090,171 A * | 2/1992 | Kano | E05D 15/0608 | 160/199 |
| 5,729,951 A * | 3/1998 | Frohlich | F16B 17/006 | 52/707 |
| 6,003,275 A * | 12/1999 | Cornell | E04B 2/827 | 52/64 |
| 6,347,808 B1 * | 2/2002 | Pennington | A63C 5/06 | 280/809 |

(Continued)

FOREIGN PATENT DOCUMENTS

| | | |
|---|---|---|
| DE | 2065747 A1 * | 10/1975 |
| DE | 2511696 B1 * | 8/1976 |

(Continued)

OTHER PUBLICATIONS

International Search Report and Written Opinion issued in related Application Serial No. PCT/US2023/067166 dated Sep. 1, 2023.

*Primary Examiner* — Jonathan P Masinick

(74) *Attorney, Agent, or Firm* — Mark H. Francis; Heath M. Sargeant; Holland & Knight LLP

(57) ABSTRACT

A modular partition track system includes a modular base portion configured to be positioned on a ground surface. A first track subsystem is positioned on at least a portion of a first surface of the modular base portion. The first track subsystem includes one or more slidable partition coupling assemblies configured to slide along the first track subsystem.

20 Claims, 8 Drawing Sheets

(56) References Cited

U.S. PATENT DOCUMENTS

| | | | | |
|---|---|---|---|---|
| 6,748,710 | B2 * | 6/2004 | Gresham | E04B 2/7425 52/36.5 |
| 6,807,776 | B2 * | 10/2004 | Girdwood | A47B 96/1483 52/36.5 |
| 7,507,005 | B1 * | 3/2009 | Mier-Langner | F21V 21/35 439/111 |
| 7,571,942 | B2 * | 8/2009 | Shapiro | E02F 3/8152 293/38 |
| 8,579,006 | B2 * | 11/2013 | Levin | E04B 2/827 160/184 |
| 8,746,601 | B2 * | 6/2014 | Cox | B02C 17/225 29/401.1 |
| 9,574,589 | B2 * | 2/2017 | Knutson | F16M 13/027 |
| 9,839,289 | B1 * | 12/2017 | Stefan | A47B 88/975 |
| 10,604,930 | B2 * | 3/2020 | Downey | E04B 2/827 |
| 11,077,888 | B2 * | 8/2021 | Zhu | B62D 33/02 |
| 11,225,791 | B2 * | 1/2022 | Gosling | E05D 7/009 |
| 2005/0279200 | A1 * | 12/2005 | Duginske | B27B 25/10 83/471.3 |
| 2008/0156951 | A1 * | 7/2008 | Lin | A47H 1/104 248/261 |
| 2009/0045760 | A1 * | 2/2009 | Busch | E05F 15/60 318/135 |
| 2020/0269369 | A1 * | 8/2020 | Poole | B23Q 1/42 |

FOREIGN PATENT DOCUMENTS

| | | | | | |
|---|---|---|---|---|---|
| DE | 202012101529 | U1 | * | 8/2012 | E04B 2/827 |
| DE | 102013227231 | A1 | * | 7/2015 | E04B 2/7425 |
| DE | 102016010226 | A1 | * | 2/2018 | |
| DE | 102017101998 | A1 | * | 8/2018 | |
| EP | 3034735 | B1 | * | 10/2017 | E05D 15/00 |
| FR | 2667490 | A1 | * | 4/1992 | E04B 2/827 |
| GB | 2093496 | A | * | 9/1982 | E04B 2/7425 |
| GB | 2483070 | A | * | 2/2012 | A47G 7/044 |

* cited by examiner

MODULAR PARTITION TRACK SYSTEM

TECHNICAL FIELD

The present disclosure generally relates to partition systems and, more particularly, for modular partition track systems.

BACKGROUND

Partition or fence systems are typically deployed to help isolate particular areas from access. However, conventional fence systems are generally either permanently deployed or are difficult to assemble and disassemble in a temporary manner. For example, many pool owners utilize fence systems to temporarily partition their pools from access during certain periods of time (e.g., in the presence of small children, during regular cleaning, etc.). However, these fence systems are cumbersome to deploy.

SUMMARY

In an embodiment, a modular partition track system includes a modular base portion configured to be positioned on a ground surface and a first track subsystem positioned on at least a portion of a first surface of the modular base portion. The first track subsystem further includes one or more slidable partition coupling assemblies configured to slide along the first track subsystem.

One or more of the following features may be included. The modular partition track system may include a second track subsystem positioned on at least a portion of a second surface of the modular base portion, the second track subsystem may include one or more second slidable portions configured to slide along the second track subsystem. The one or more slidable partition coupling assemblies of the first track subsystem and the one or more second slidable portions of the second track subsystem may be configured to slide independently of each other. The first track subsystem may be positioned on a top surface of the modular base portion and the second track subsystem may be positioned on a bottom surface of the modular base portion. The one or more second slidable portions include one or more mounting assemblies. The one or more mounting assemblies may be configured to releasably engage one or more apertures formed within the ground surface. The one or more slidable partition coupling assemblies may be configured to be removably coupled to one or more partition posts of a collapsible partition assembly. One or more collapsible partition panels of the collapsible partition assembly may be configured to at least one of: expand as the one or more slidable partition coupling assemblies are pulled apart from one another on the first track subsystem, and collapse as the one or more slidable partition coupling assemblies are compressed together on the first track subsystem. The modular base portion may be configured to be removably couplable to at least one additional modular base portion. The first track subsystem of the modular base portion may be configured to join with a corresponding first track subsystem of the at least one additional modular base portion when the modular base portion may be coupled to the at least one additional modular base portion. Wherein the first track subsystem may be configured to extend along the length of the modular base portion. The one or more slidable partition coupling assemblies may be configured to slide along the length of the modular base portion. The second track subsystem may be configured to extend along the length of the modular base portion. The one or more second slidable portions may be configured to slide along the length of the modular base portion.

According to another embodiment, a modular partition track system includes a modular base portion and a first track subsystem positioned on at least a portion of a first surface of the modular base portion. The first track subsystem may include one or more first slidable portions configured to slide along the first track subsystem. The modular partition track system further may include a second track subsystem positioned on at least a portion of a second surface of the modular base portion. The second track subsystem may include one or more second slidable portions configured to slide along the second track subsystem.

One or more of the following features may be included. The one or more first slidable portions include one or more slidable partition coupling assemblies. The one or more slidable partition coupling assemblies may be configured to be removably coupled to one or more partition posts of a collapsible partition assembly. The one or more slidable partition coupling assemblies include a threaded portion configured to receive a corresponding threaded sleeve portion configured to be removably coupled to a partition post of the one or more partition posts of the collapsible partition assembly. The modular partition track system may include an integrated lighting system.

According to yet another embodiment, a modular partition track system includes a modular base portion and a first track subsystem extending along the length of a top surface of the modular base portion. The first track subsystem may include one or more one or more slidable partition coupling assemblies configured to slide along the first track subsystem. The modular partition track system further includes a second track subsystem extending along the length of a bottom surface of the modular base portion, the second track subsystem may include one or more second one or more mounting assemblies configured to slide along the second track subsystem. The one or more slidable partition coupling assemblies are configured to be releasably coupled to one or more partition posts of a collapsible partition assembly.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF EXAMPLE EMBODIMENTS

In general, consistent with the present disclosure, a modular partition track system is provided. For example, and referring generally to FIGS. 1-8, in some embodiments, a modular partition track system may include a modular base portion configured to be positioned on a ground surface. A first track subsystem may be positioned on at least a portion of a first surface of the modular base portion. The first track subsystem may include one or more slidable partition coupling assemblies configured to slide along the first track subsystem.

As discussed above, partition or fence systems are typically deployed to help isolate particular areas from access. However, conventional fence systems are generally either permanently deployed or are difficult to assemble and disassemble in a temporary manner. For example, many pool owners utilize pool fence systems to temporarily partition their pools from access during certain periods of time (e.g., in the presence of small children, during regular cleaning, etc.). However, these pool fence systems are cumbersome to deploy. Accordingly, embodiments of the present disclosure may allow for a partition system to be deployed with minimal effort by simply positioning one or more modular base portions and coupling posts of the partition system to corresponding sliding portions of the modular partition track system. The partition system may slide along the modular track into a desired position. In this manner, the modular partition track system of the present disclosure may allow for convenient deployment of a partition system in a modular form that may account for particular environments.

Figure 1:
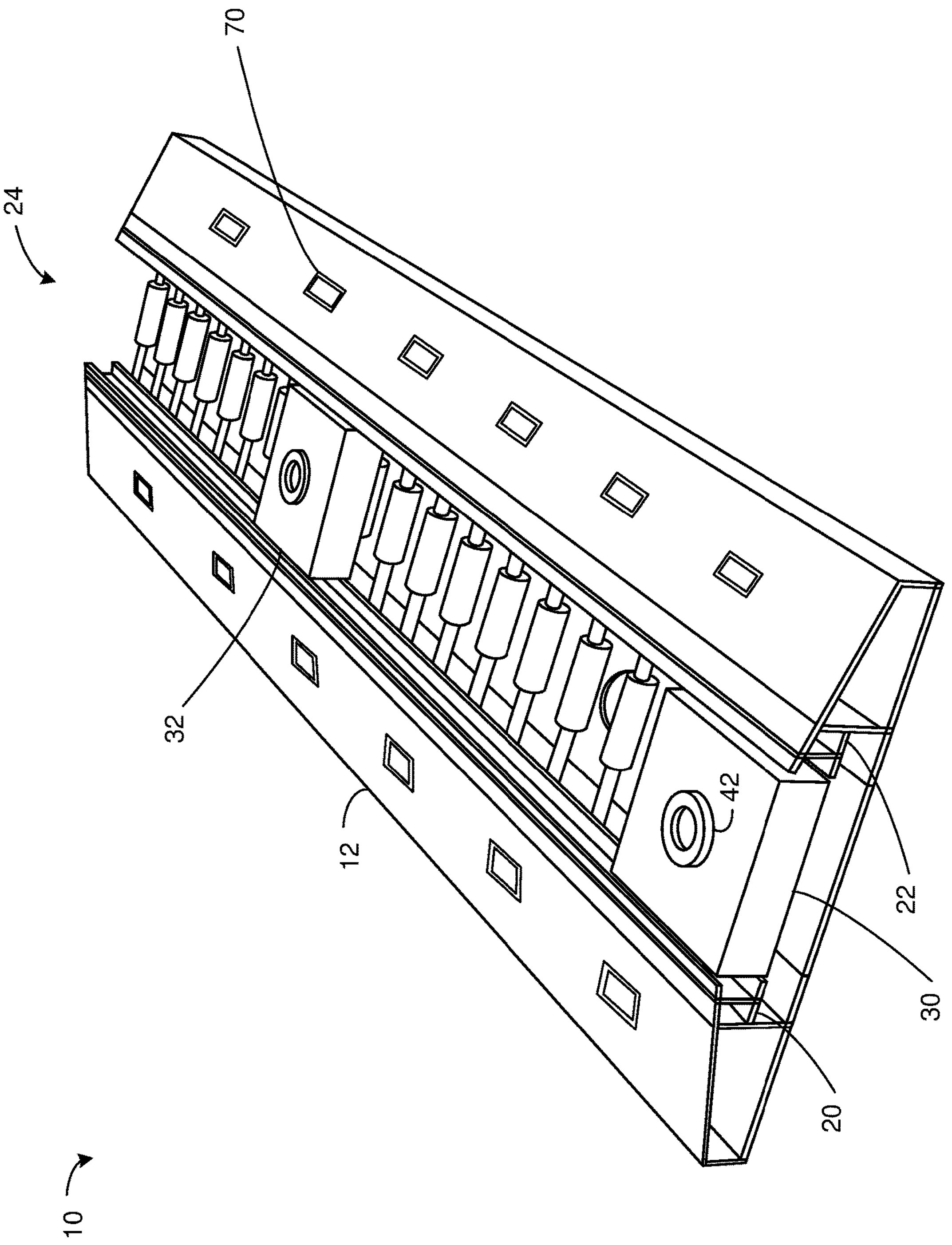
FIG. 1 is a perspective view of a modular partition track system, according to an example embodiment.
Figure 2:
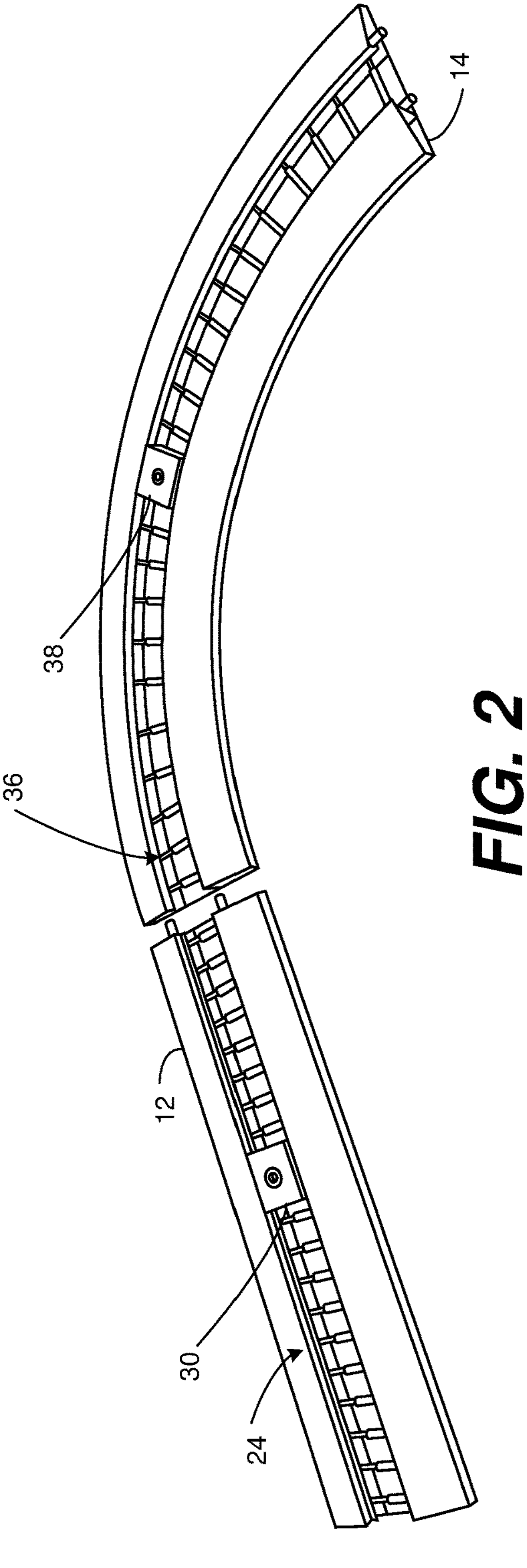
FIGS. 2-3 are perspective views of multiple modular base portions of a modular partition track system, according to various example embodiments.

In some embodiments, a modular partition track system may include a modular base portion configured to be positioned on a ground surface. Referring to FIG. 1 and in some embodiments, a modular partition track system (e.g., modular partition track system 10) may include a modular base portion (e.g., modular base portion 12). Modular base portion 12 may be configured to be positioned on a ground surface. For example, modular base portion 12 may generally include a weighted structure configured to anchor a partition system. In some embodiments, modular base portion 12 may be formed from various materials (e.g., metals, metal alloys, plastics, wood products, etc.) and may be weighted (e.g., with internal weights and/or by virtue of the properties of the structure of modular base portion 12) to stabilize a partition system. In this manner and as will be discussed in greater detail below, modular base portion 12 may be sufficiently weighted to allow movement of portions of a partition system along the first track subsystem without moving the entirety of modular partition track system 10.

In some implementations, modular base portion 12 may be a rigid structure and/or may be at least partially malleable. For example and in some embodiments, modular base portion 12 may be shaped (e.g., either at time of manufacture and/or when deploying modular partition track system 10) into various configurations. In one example, modular base portion 12 may be shaped as a segment with no bends or curves. In another example, modular base portion 12 may be shaped with one or more curves or bends. Accordingly, it will be appreciated that modular base portion 12 may be sufficiently malleable to be shaped into any shape within the scope of the present disclosure.

In some embodiments, modular base portion 12 may be configured in a generally trapezoidal shape (i.e., when viewed as a cross-section). Referring again to FIG. 1 and in some implementations, modular base portion 12 may include a wide bottom surface and a narrow top surface with sloped sides. For example and as will be discussed in greater detail below, the wide bottom surface may provide for stability of a partition assembly coupled to a first track subsystem. In some embodiments, the bottom surface may be sufficiently wide to form gradual inclined edges between the bottom surface and the top surface. In this manner, individuals may traverse the modular base portion 12 safely and easily. While an example of a trapezoidal shape has been described, it will be appreciated that modular base portion 12 may be configured in any shape within the scope of the present disclosure.

In some embodiments, the modular base portion may be configured to be removably couplable to at least one additional modular base portion. Referring also to the example of FIG. 2 and in some embodiments, modular base portion 12 may be configured to be removably couplable to at least one additional modular base portion (e.g., modular base portion 14). For example and as discussed above, modular base portion 12 may be a rigid structure formed (e.g., at the time of manufacturing) into a particular shape (e.g., a segment without bends or curves) while modular base portion 14 may be formed (e.g., at the time of manufacturing) into a different shape (e.g., a bend or curve shape). In this manner, modular base portion 12 and/or modular base portion 14 may be manufactured in various shapes and coupled to allow for custom configurations and layouts for modular partition track system 10.

Figure 3:
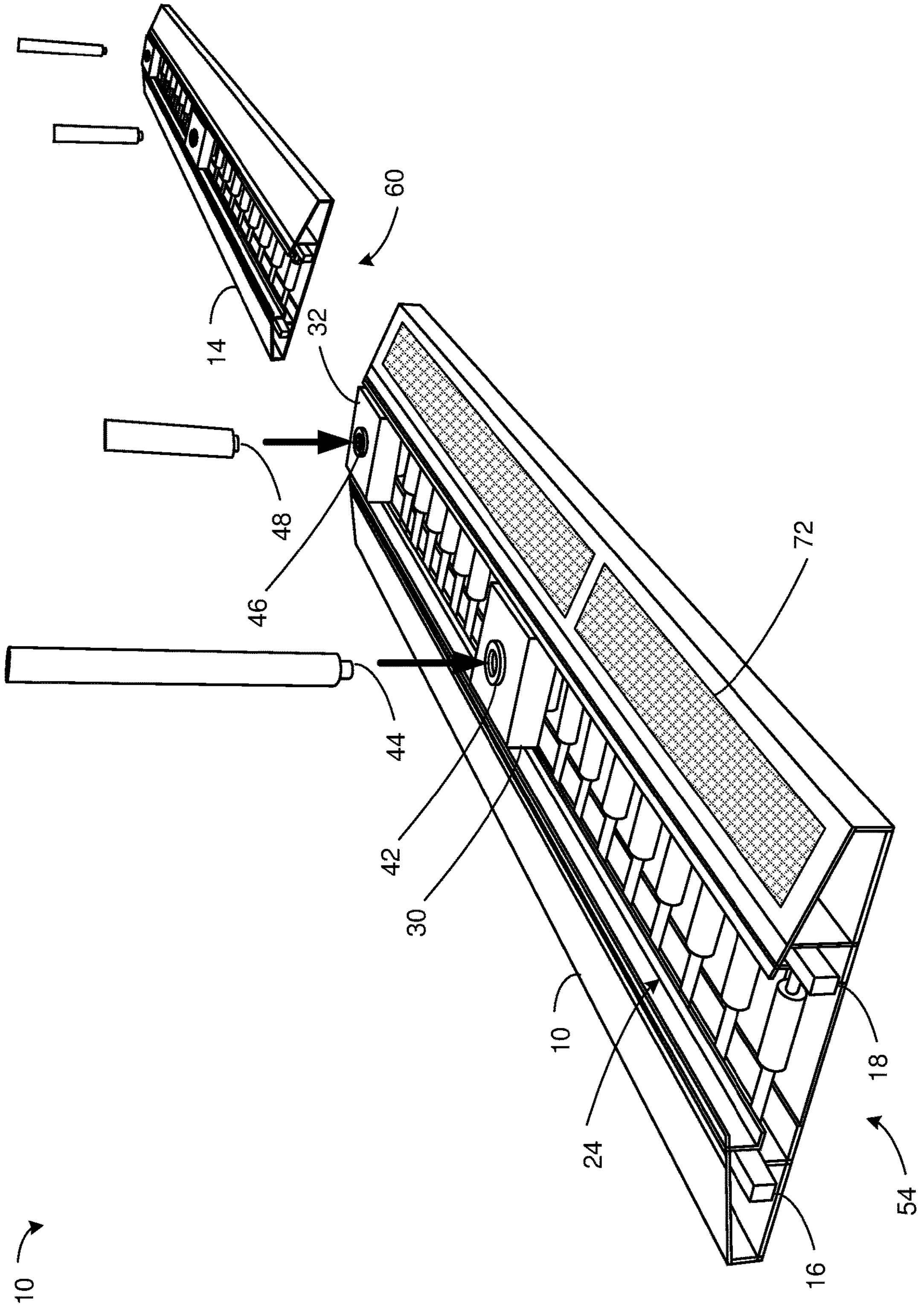
Figure 4:
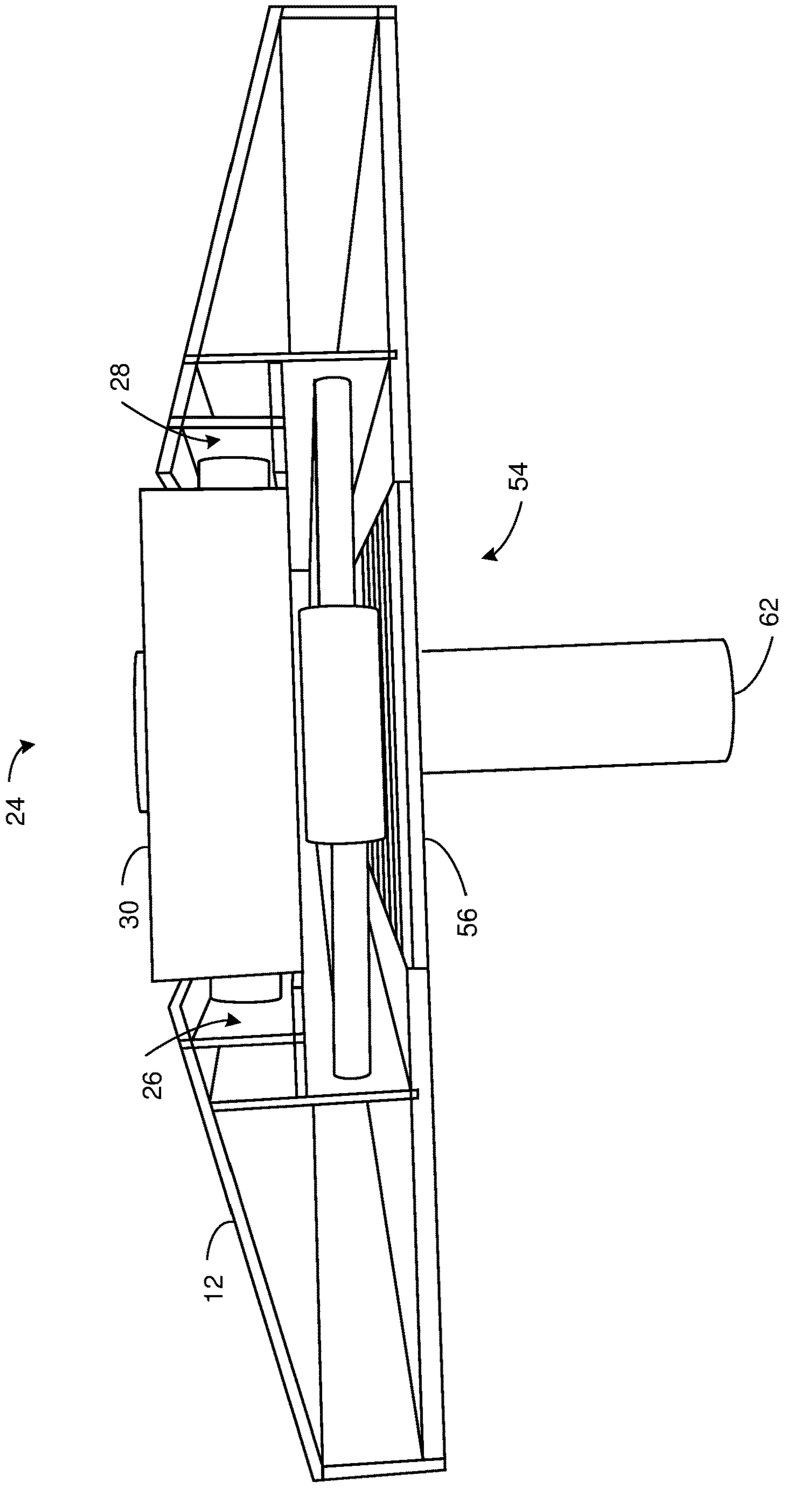
FIG. 4 is a front elevation view of a modular partition track system, according to various example embodiments.

In some embodiments, modular base portion 12 may include one or more connectors for releasably coupling to at least one additional modular base portion (e.g., modular base portion 14). Referring also to FIG. 3 and in some embodiments, modular base portion 12 may include one or more connectors (e.g., connectors 16, 18) extending from a first end of modular base portion 12 that are configured to be received in corresponding slots of modular base portion 14. In some embodiments, the one or more connectors (e.g., connectors 16, 18) may be integrated into modular base portion 12 and/or may be configured to be coupled to the corresponding slots of modular base portion 14. For example, modular base portion 12 may include connectors (e.g., connectors 16, 18) that are configured to releasably couple to corresponding slots (e.g., slots 20, 22 as shown in FIG. 1) of modular base portion 14. In some embodiments, the one or more connectors may be releasably coupled to slots 20, 22 of modular base portion 12 and slots 20, 22 of modular base portion 14. Accordingly, connectors 16, 18 may not be integrated into modular base portion 12 and/or modular base portion 14 and may be inserted into slots of each modular base portion. In some embodiments, connectors 16, 18 may be configured with biasing elements configured to secure connectors 16, 18 in corresponding slots of modular base portion 12. While examples of two connectors have been shown and described, it will be appreciated that any number of connectors may be used within the scope of the present disclosure.

In some embodiments, the modular partition track system may include a first track subsystem on at least a portion of a first surface of the modular base portion. Referring again to the example of FIG. 1 and in some embodiments, modular partition track system 10 may include a first track subsystem (e.g., first track subsystem 24) positioned on at least a portion of a first surface (e.g., a top surface) of modular base portion 12. In some embodiments, first track subsystem 24 may be at least partially integrated into the top surface of modular base portion 10. Referring also to the example of FIG. 4 and in some embodiments, sloped edges of modular base portion 12 may define first track subsystem 24 with parallel grooves (e.g., grooves 26, 28) formed on opposite sides within modular based portion 12. In this manner and as will be described in greater detail below, first track subsystem 24 may be configured to allow one or more first slidable portions (e.g., first slidable portions 30, 32) to slide along first track subsystem horizontally while preventing the one or more slidable portions from being removed (e.g., by application of force vertically).

Figure 5:
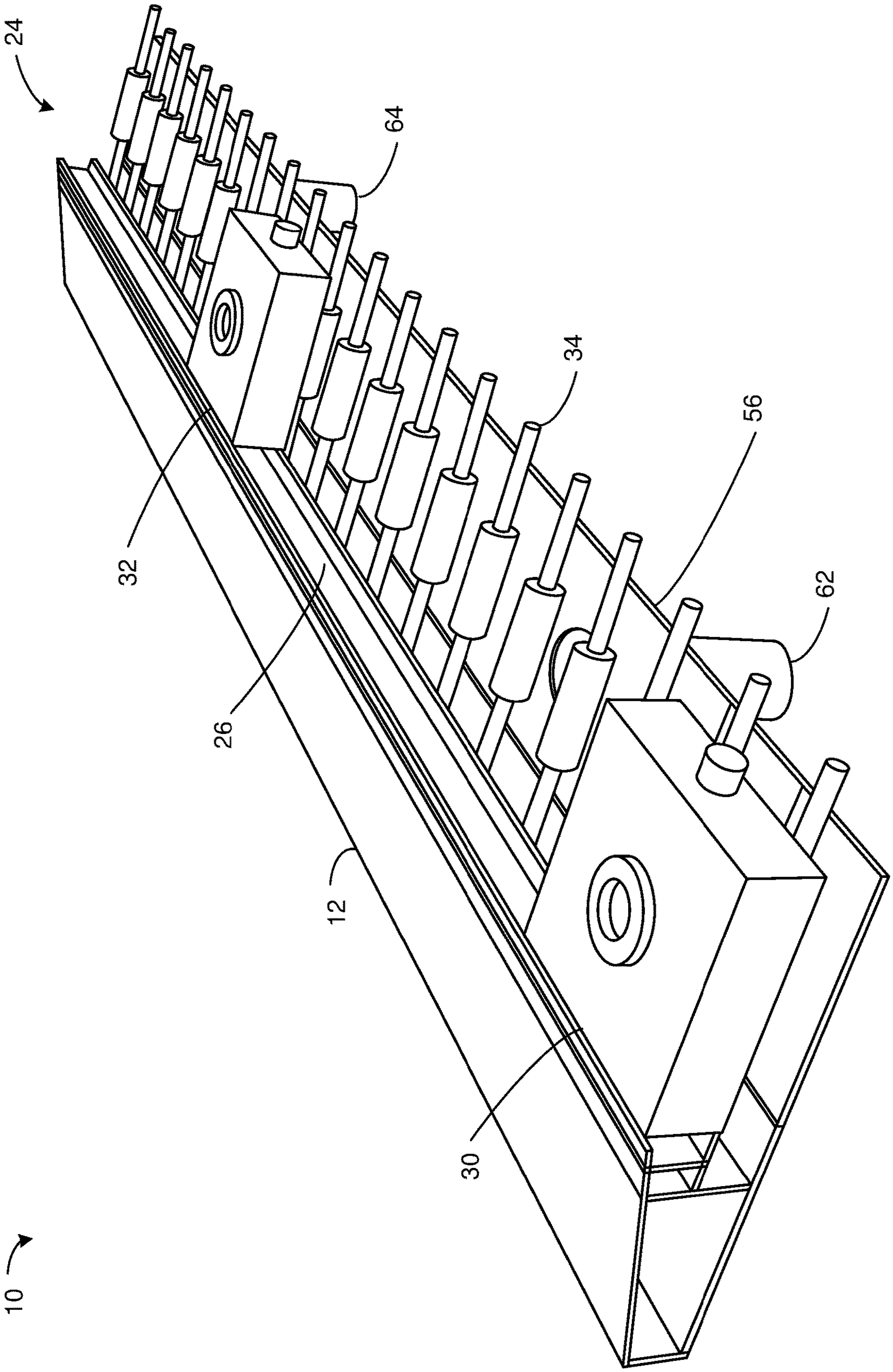
FIG. 5 is a perspective, interior view of a modular partition track system, according to various example embodiments.

In some embodiments, the first track subsystem may include one or more first slidable portions configured to slide along the first track subsystem. Referring also to FIG. 5 and in some embodiments, first track subsystem 24 may include a plurality of rolling mechanisms (e.g., rolling mechanism 34) positioned along the first track subsystem between parallel grooves 26, 28 to allow first slidable portions 30, 32 to slide along the length of first track subsystem 24. In some embodiments, first slidable portions 30, 32 may include one or more rollers, wheels, and/or curved extensions configured to extend into parallel grooves 26, 28. In this manner, first slidable portions 30, 32 may be configured to slide or roll along the length of first track subsystem 24.

In some embodiments, the first track subsystem may be configured to extend along the length of the modular base portion. Referring again to the example of FIG. 1 and in some embodiments, first track subsystem 24 may define a track for first slidable portions 30, 32 to slide along. In some embodiments, first track subsystem 24 may extend along the entire length of modular base portion 12 such that first slidable portions 30, 32 may slide along first track subsystem 24 between one end of modular base portion 12 to the other.

In some embodiments, the first track subsystem of the modular base portion may be configured to join with a corresponding first track subsystem of the at least one additional modular base portion when the modular base portion is coupled to the at least one additional modular base portion. Referring again to FIG. 2 and in some embodiments, first track subsystem 24 of modular base portion 10 may be configured to join with first track subsystem 36 of modular base portion 14 when modular base portion 12 and modular base portion 14 are coupled together. In some embodiments, first slidable portions 30, 38 may be configured to slide from first track subsystem 24 of modular base portion 12 to first track subsystem 36 of modular base portion 14 and vice versa. In this manner, by coupling modular base portion 12 and modular base portion 14, first slidable portions 30, 38 may be configured to slide along the combined length of the first track subsystem 24 and first track subsystem 36. Accordingly, when joined with other first track subsystems, a continuous track for the first slidable portions may be formed.

In some embodiments, the one or more first slidable portions may include one or more slidable partition coupling assemblies. Referring again to the example of FIG. 3 and as will be discussed in greater detail below, first slidable portions 30, 32 may be configured to receive at least a portion of a partition assembly. Accordingly, first slidable portions 30, 32 may also be referred to as slidable partition coupling assemblies 30, 32 within the scope of the present disclosure.

In some embodiments, the one or more slidable partition coupling assemblies may be configured to be removably coupled to one or more partition posts of a collapsible partition assembly. Referring also to the example of FIG. 6 and in some embodiments, modular partition track system 10 may allow a partition assembly (e.g., a fence or other structure) to be deployed without requiring an upper or overhead track. For example modular base portion 12 may be weighted and sized (e.g., as discussed above) to allow a partition assembly (e.g., partition assembly 40) to be deployed and moved along modular partition track system 10 without tipping over. As will be discussed in greater detail below and in some embodiments, modular partition track system 10 may include a second track subsystem with one or more mounting assemblies configured to removably couple modular partition track system 10 in the ground or to a surface.

In some embodiments, the one or more slidable partition coupling assemblies may include an aperture (e.g., aperture 42) configured to receive at least a portion of a partition post of a collapsible partition assembly. As shown in the example of FIG. 3 and in some embodiments, a partition post 44 may be slid (at least partially) into aperture 42 of slidable partition coupling assembly 30. In some embodiments, aperture 42 may be formed in various sizes. For example, typical pool fence posts or poles have a diameter ranging from e.g., 0.5 inches to 1 inch. Accordingly, aperture 42 may be configured in various sizes to receive various post sizes. While example diameters have been described, it will be appreciated that these are for example purposes only and that aperture 42 may be sized to receive any sized partition post within the scope of the present disclosure. In some embodiments, slidable partition coupling assembly 30 and/or partition post 44 may include one or more fasteners to removably couple partition post 44 to slidable partition coupling assembly 30. Various fasteners known in the art may be used to removably couple partition post 44 to slidable partition coupling assembly 30 within the scope of the present disclosure.

In some embodiments, the one or more slidable partition coupling assemblies may include a threaded portion configured to receive a corresponding threaded sleeve portion configured to be removably coupled to a partition post of the one or more partition posts of the collapsible partition assembly. Referring again to the example of FIG. 3 and in some embodiments, slidable partition coupling assembly 32 may include a threaded aperture (e.g., aperture 46) configured to receive a threaded sleeve portion (e.g., threaded sleeve portion 48). In some embodiments, threaded sleeve portion 48 may include a sleeve configured to receive at least a portion of partition post 44 and a threaded extension configured to be threaded into corresponding threads of threaded aperture 46 of slidable partition coupling assembly 32. While an example of a threaded sleeve portion has been described, it will be appreciated that sleeve portion 48 may include various types of interlocking fasteners configured to engage corresponding fasteners within slidable partition coupling assembly 32 (e.g., corresponding magnetic portions, corresponding interlocking notches and extensions, press-fit assemblies, etc.) within the scope of the present disclosure. In some embodiments, sleeve portion 48 may be configured to adapt partition post 44 to a particular aperture size. For example and as discussed above, typical pool fence posts or poles have a diameter ranging from e.g., 0.5 inches to 1 inch. As such sleeve portion 48 may be configured to receive a range of partition post sizes and may adapt the partition post for a particular aperture size and/or shape of a slidable partition coupling assembly (e.g., the size and shape of aperture 46 of slidable partition coupling assembly 32).

In some embodiments, the one or more slidable partition coupling assemblies may include a threaded portion configured to receive a threaded portion of a partition post of the one or more partition posts of the collapsible partition assembly. For example, partition post 44 may include an integrated threaded portion extending from one end of partition post 44 that may be threaded into corresponding threads of slidable partition coupling assembly 32. While an example of a threaded portion of a partition post has been described, it will be appreciated that partition post 44 may include various types of interlocking fasteners or features configured to engage corresponding fasteners or features within slidable partition coupling assembly 32 (e.g., corresponding magnetic portions, corresponding interlocking notches and extensions, press-fit assemblies, etc.) within the scope of the present disclosure.

Figure 6:
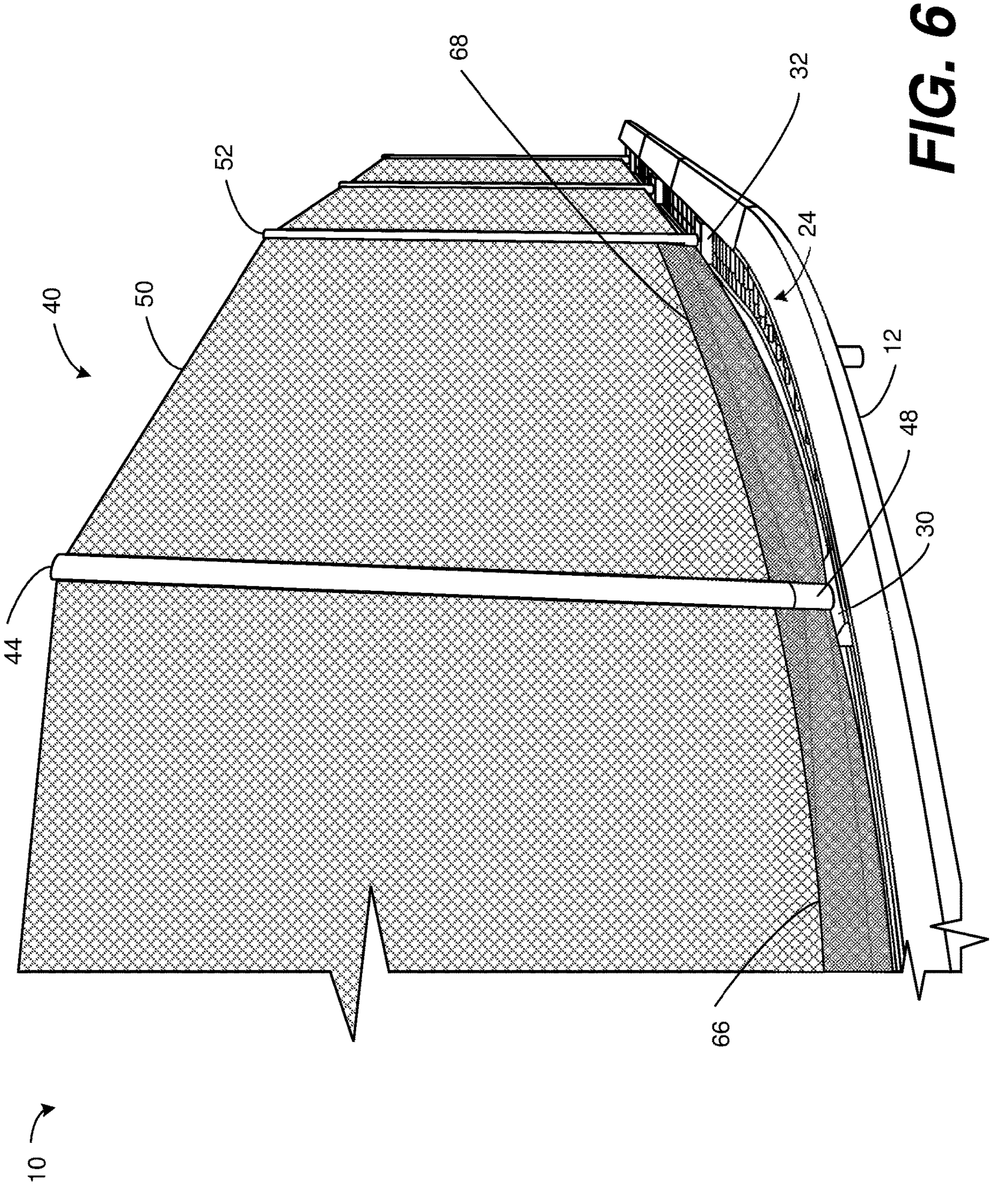
FIGS. 6-7 are diagrammatic views a partition system coupled to a modular partition track system, according to various example embodiments.

In some embodiments, one or more collapsible partition panels of the collapsible partition assembly may be configured to expand as the one or more slidable partition coupling assemblies are pulled apart from one another on the first track subsystem. Referring again to the example of FIG. 6 and in some embodiments, partition assembly 40 may include one or more collapsible partition panels (e.g., collapsible partition panel 50). A collapsible partition panel may generally include a panel formed between two posts that is capable of being expanded and collapsed. For example, collapsible partition panel 50 may include, but is not limited to, a plurality of rigid portions configured to fold together, a fabric or non-rigid sheet of material, an accordion panel, a material configured to be pulled from a retractable wound roll, etc. An example of a collapsible partition is a pool fence configured to be installed adjacent a swimming pool, hot tub, or other recreational body of water. However, it will be appreciated that any type of partition or fence may be used within the scope of the present disclosure. As shown in the example of FIG. 6 and in some embodiments, as slidable partition coupling assembly 30 is pulled away from slidable partition coupling assembly 32 along first track subsystem 24, collapsible partition panel 50 of partition assembly 40 may expand until collapsible partition panel 50 is fully expanded or fully taut.

In some embodiments, the one or more collapsible partition panels of the collapsible partition assembly may be configured to collapse as the one or more slidable partition coupling assemblies are compressed together on the first track subsystem. As discussed above and in some embodiments, collapsible partition panel 50 may rely on tension between partition posts 44 and 52 to maintain its shape as a panel. Accordingly, as slidable partition coupling assembly 30 is slid along first track subsystem 24 toward slidable partition coupling assembly 32, collapsible partition panel 50 may collapse (e.g., sag or slacken). In this manner, by sliding slidable partition coupling assembly 30 in one direction, a partition assembly may be deployed (e.g., with expanded panels between partition posts) in a particular position along first track subsystem 24). The partition assembly may be removed (e.g., moved and/or collapsed) by sliding slidable partition coupling assembly 30 in the opposite direction.

Figure 7:
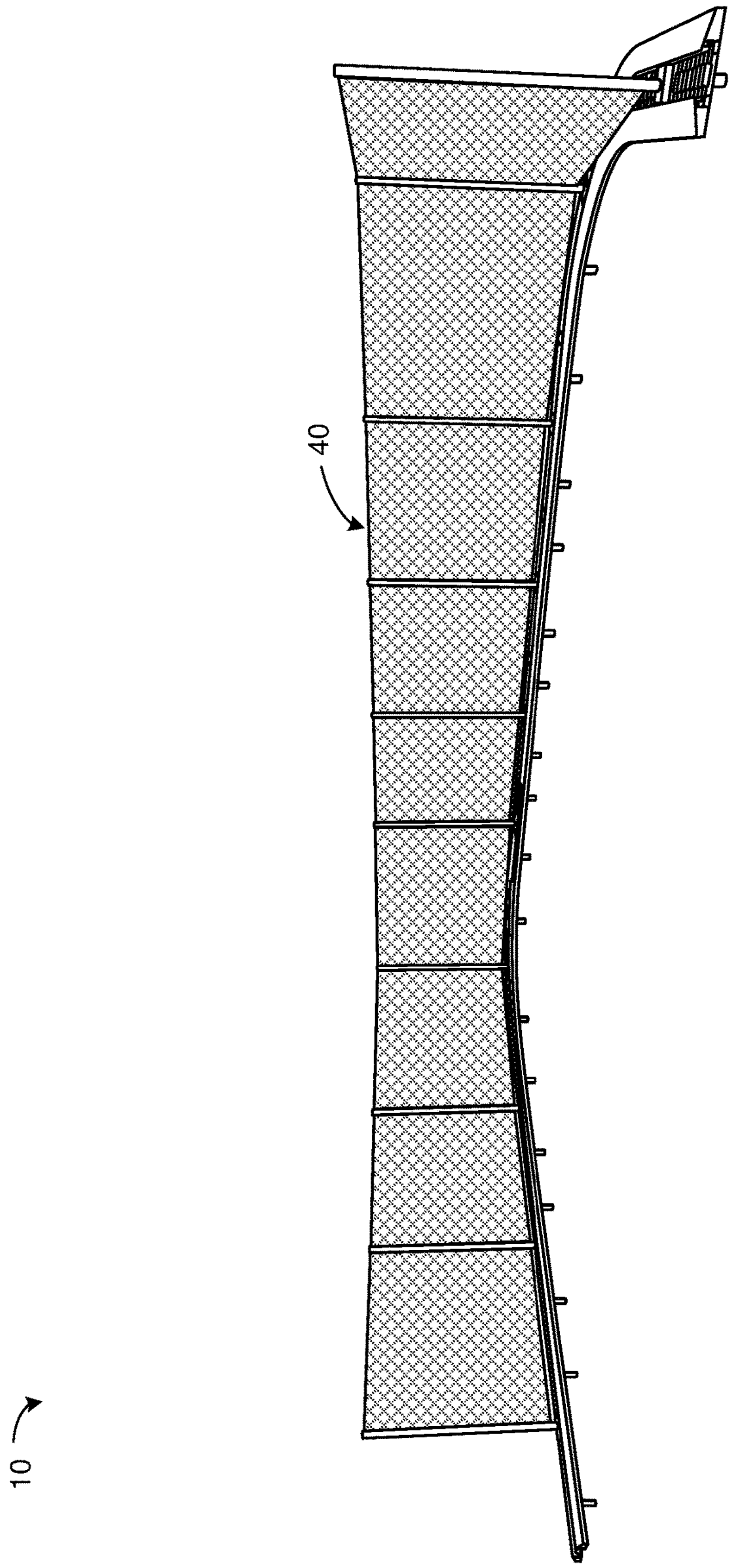

Referring also to FIG. 7 and in some embodiments, by pulling along a partition post of partition assembly 40 coupled to modular partition track system 10, partition assembly 40 may be positioned along modular partition track system in various configurations.

Figure 8:
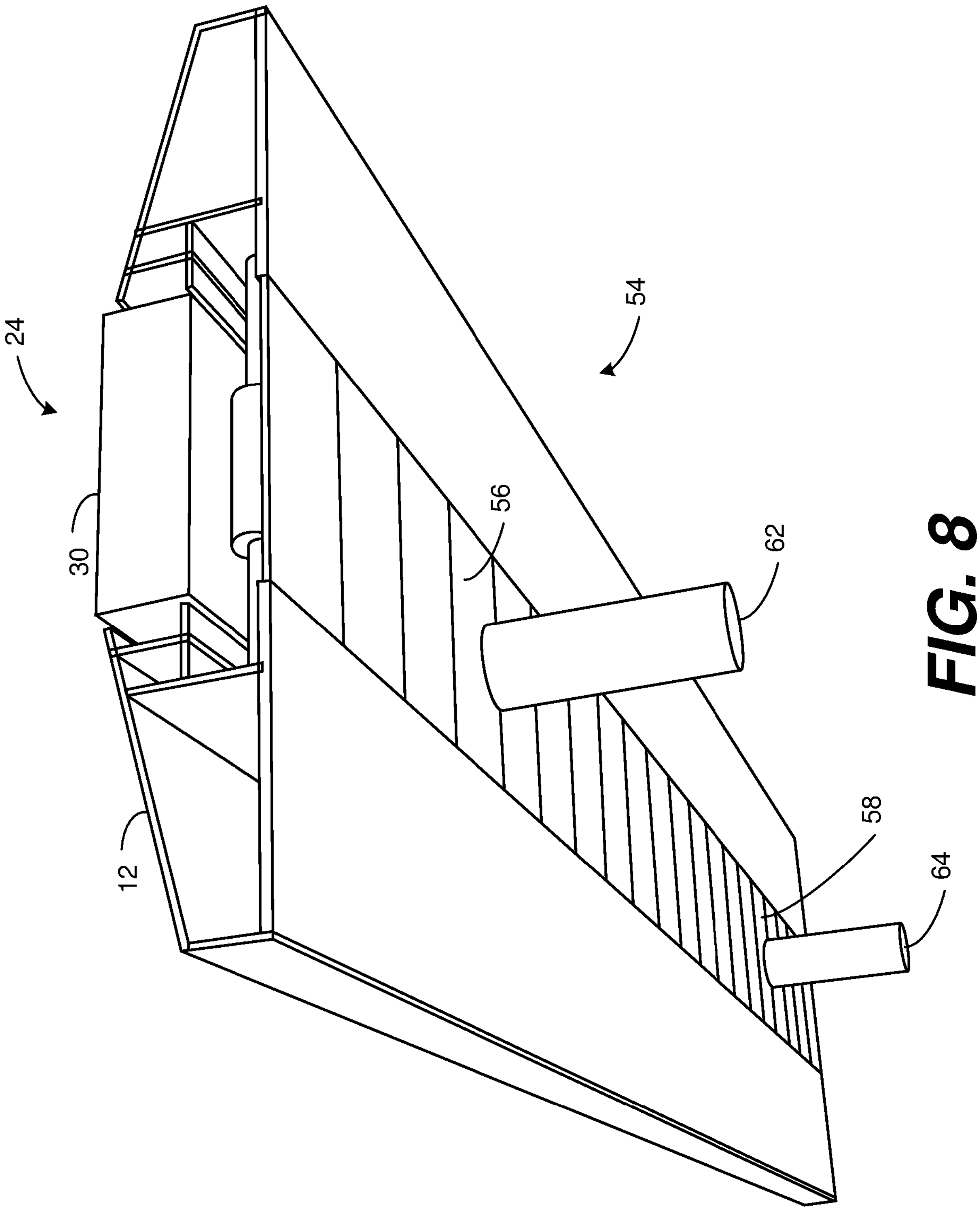
FIG. 8 is a diagrammatic view of a modular partition track system with a first track subsystem and a second track subsystem, according to various example embodiments.

In some embodiments, the modular partition track system may include a second track subsystem positioned on at least a portion of a second surface of the modular base portion, the second track subsystem including one or more second slidable portions configured to slide along the second track subsystem. Referring also to FIG. 8 and in some embodiments, modular partition track system 10 may include a second track subsystem (e.g., second track subsystem 54) positioned on at least a portion of a second surface (e.g., a bottom surface) of modular base portion 12. In some embodiments, second track subsystem 54 may be at least partially integrated into the bottom surface of modular base portion 12.

In some embodiments, the second track subsystem may include one or more second slidable portions configured to slide along the second track subsystem. Referring again to FIG. 8 and in some embodiments, second track subsystem 54 may include a plurality of rolling mechanisms positioned along the second track subsystem to allow second slidable portions 56, 58 to slide along the length of second track subsystem 54. In some embodiments, second slidable portions 56, 58 may include one or more rollers, wheels, and/or curved extensions configured to extend into modular base portion 12. For example and referring again to FIG. 5, first track subsystem 24 and second track subsystem 54 may share or utilize a plurality of rolling mechanisms positioned within modular base portion 12 to slide the first slidable portions or the second slidable portions. In this manner, second slidable portions 56, 58 may be configured to slide or roll along the length of second track subsystem 54.

In some embodiments, the second track subsystem of the modular base portion may be configured to join with a corresponding second track subsystem of the at least one additional modular base portion when the modular base portion is coupled to the at least one additional modular base portion. Referring again to FIGS. 3-4 and in some embodiments, second track subsystem 54 of modular base portion 12 may be configured to join with second track subsystem 60 of modular base portion 14 when modular base portion 12 and modular base portion 14 are coupled together. In some embodiments, second slidable portions 56, 58 may be configured to slide from second track subsystem 54 of modular base portion 12 to second track subsystem 60 of modular base portion 14 and vice versa. In this manner, by coupling modular base portion 12 and modular base portion 14, second slidable portions 56, 58 may be configured to slide along the combined length of the second track subsystem 54 and second track subsystem 60. Accordingly, when joined with other second track subsystems, a continuous track for the second slidable portions may be formed.

In some embodiments, second track subsystem 54 may be limited to a particular modular base portion. For example and referring again to FIG. 8, second track subsystem 54 may be configured to start and end at the ends of modular base portion 12. In this manner, second track subsystem 54 may be limited to modular base portion 12.

In some embodiments, the one or more second slidable portions may include one or more mounting assemblies. For example and referring again to FIG. 8, second slidable portion 56 may include a mounting assembly (e.g., mounting assembly 62). A mounting assembly may generally include any structure configured to releasably engage one or more corresponding mounting structures on and/or within a surface. In one example, mounting assembly 62 may include an extension configured to releasably engage one or more apertures formed within a ground surface. In some embodiments, mounting assembly 62 may include various sized extensions (e.g., different diameters or widths). For example, typical pool fence posts or poles have a diameter ranging from e.g., 0.5 inches to 1 inch, with 0.5 to 1 inch corresponding apertures in the ground or surface. Accordingly, mounting assembly 62 may be configured in various sizes to releasably engage the corresponding apertures. While example diameters have been described, it will be appreciated that these are for example purposes only and that mounting assembly 62 may be sized to releasably engage any sized aperture within the scope of the present disclosure.

In some embodiments, mounting assembly 62 may include a mounting sleeve for scaling up or down the diameter or width of a partition post or pole connecting to the ground. For example, suppose that partition post 44 has a diameter of e.g., 1 inch and the corresponding apertures in the ground have a diameter of e.g., 1 inch while mounting assembly 62 has a diameter of e.g., 0.5 inches. In this example, mounting assembly 62 may be coupled to a mounting sleeve to scale up the diameter of mounting assembly 62 to releasably engage the corresponding apertures in the ground. While example diameters have been described, it will be appreciated that these are for example purposes only and that a mounting sleeve may be sized to releasably engage any sized aperture within the scope of the present disclosure.

In some embodiments, the one or more slidable partition coupling assemblies of the first track subsystem and the one or more second slidable portions of the second track subsystem may be configured to slide independently of each other. Referring again to the example of FIG. 8 and in some embodiments, first slidable portion (or slidable partition coupling assembly 30, as discussed above) of first track subsystem 24 may be configured to slide or operate within first track subsystem 24 independently from second slidable portion 56 of second track subsystem 54. For example, when positioning modular track portion 12, second slidable portions 56, 58 of second track subsystem 54 may slide independently from first slidable portion 30 of first track subsystem 24. In this manner, second slidable portions 56, 58 may be positioned (e.g., by sliding along second track subsystem 54) into alignment with one or more apertures in the ground or surface and a partition system may be independently moved by sliding first slidable portion 30 of first track subsystem 24.

In some embodiments, the sleeve portion may include a skirt assembly configured to be coupled to the bottom of a partition post and coupled to the sleeve assembly. Referring again to the example of FIG. 6 and in some embodiments, sleeve portion 48 may include a skirt assembly (e.g., skirt assemblies 66, 68) that is coupled to the bottom of sleeve portion 48 (e.g., where sleeve portion 48 makes contact with slidable partition coupling assembly 30) and is configured to be coupled to partition post 44. In this manner, any gap between the bottom of partition assembly 40 may be covered by skirt assemblies 66, 68. It will be appreciated that various fasteners and/or coupling mechanisms may be used to coupled skirt assemblies 66, 68 to partition post 44 within the scope of the present disclosure. For example, skirt assemblies 66, 68 may interface with existing fasteners coupling partition panel 50 to partition post 44 to couple skirt assemblies 66, 68 to partition post 44. In some embodiments, skirt assemblies 66, 68 may be coupled directly to partition post 44 without sleeve portion 48.

In some embodiments, the modular partition track system may include an integrated lighting system. Referring again to FIG. 1 and in some embodiments, modular track partition system 10 may include an integrated lighting system (e.g., lighting system 70). As shown in FIG. 1, lighting system 70 may include a plurality of light sources positioned along the length of modular base portion 12. Examples of light sources may include, but are not limited to, light emitting diodes (LEDs), fluorescent lights, halogen lights, and combinations thereof. In some implementations, light source may be positioned on slidable partition coupling assemblies 30, 32. Accordingly, it will be appreciated that lighting system 70 may include light sources positioned across various portions of modular partition track system 10 within the scope of the present disclosure.

Referring again to the example of FIG. 3 and in some embodiments, modular partition track system 10 may be configured to be coupled to a power supply and/or may include power source (e.g., solar panels) mounted on at least a portion of modular partition track system 10. For example, a plurality of solar panels (e.g., solar panel 72) may be positioned on a top surface of modular base portion 12. In some embodiments, modular base portion 12 may include an inverter configured to convert direct current generated by solar panel 72 into alternating current for use by modular partition track system 10 and/or for coupling to a photovoltaic power system (e.g., a grid-tied power system). In some embodiments, modular partition track system 10 may include a plurality of rechargeable batteries or other power supplies that may be charged by solar panel 72. While FIG. 3 shows e.g., two solar panels, it will be appreciated that any number of solar panels in any configuration may be used within the scope of the present disclosure.

In some embodiments, modular partition track system 10 may be configured to transmit power between modular base portions. For example and referring again to FIG. 3, modular base portion 12 may include a power transmission line configured to transmit power along the length of modular base portion 12. In one example, a power transmission line of modular base portion 12 may include connectors configured to be coupled to corresponding connectors of modular base portion 14. In another example, connectors of the power transmission line of modular base portion 12 may be integrated into one or more of connectors 16, 18. In this manner, when modular base portion 12 is physically coupled to modular base portion 14, the power transmission line of modular base portion 12 may be electrically coupled to the power transmission line of modular base portion 14. In some embodiments, the power transmission line may include a data transmission line. As will be discussed in greater detail below, the data transmission line may allow enhanced control of electronic components integrated into modular base portion 12 and/or electronic components coupled to modular base portion 12.

In some embodiments, modular partition track system 10 may include a power module coupled to the power transmission line and configured to power components coupled to and/or integrated into modular partition track system 10. As discussed above and in some embodiments, the power module may include an inverter for converting an electrical current generated by solar panel 72 from direct current to alternating current. In some embodiments, the power module of modular partition track system 10 may include multiple power modules (e.g., one power module for each module base portion) configured to distribute and regulate power supplied to various electronic components integrated into each modular base portion and/or electronic components coupled to each modular base portion. For example, modular partition track system 10 may provide power for integrated lighting system 70, power to an integrated audio system (not shown), and/or power for coupling other components (e.g., external power ports or external USB ports, etc.). In this manner, modular partition track system 10 may provide power to various electronic components integrated into modular partition track system 10 and/or that may be electrically coupled to modular partition track system 10 (e.g., via an electrical connector). In some embodiments, modular partition track system 10 may be configured to physically and electrically couple to partition posts. In this manner, power may be provided to electronic components coupled to partition posts of the partition assembly.

In some embodiments and as discussed above, in addition to a power transmission line, modular partition track system 10 may include a data transmission line. In some embodiments and in addition to a power module, modular partition track system 10 may include a data interface module configured to provide control to electronic components coupled to and/or integrated within modular partition track system 10. For example, the data interface module may include various hardware and/or software components known in the art that allow an electronic device (e.g., a remote control, a smartphone, a tablet, or any other computing device) to control the electronic components coupled to and/or integrated within modular partition track system 10. In some embodiments, the data interface module may be coupled to the electronic devices via various wired and wireless communication protocols (e.g., a serial connection, Bluetooth®, Wi-Fi®, etc.). In this manner, various electronic components coupled to and/or integrated within modular partition track system 10 (e.g., lighting, audio systems, electronic components within modular partition track system 10) may be controlled via external electronic devices.

In some embodiments and as discussed above, modular partition track system 10 may allow a partition assembly to be slid along the first track subsystem. In one example, this process may be performed manually by an individual pulling along the partition posts and/or the slidable partition coupling assemblies. In another example, first track subsystem 24 may be energized (e.g., with various motors, control systems, and power connections as discussed above) to drive the one or more slidable partition coupling assemblies along first track subsystem 24. As discussed above and in some embodiments, modular partition track system 10 may include various controls (e.g., a remote control, an interface for smartphones, tablets, or other computing devices, etc.) to operate the motorized movement of the one or more slidable partition coupling assemblies along first track subsystem 24. In this manner, modular partition track system 10 may allow for a motorized deployment of a partition assembly.

In some embodiments, modular partition track system 10 may include a partition assembly housing configured to store the un-deployed portions of the partition assembly. For example and as discussed above, suppose partition assembly 40 includes collapsible partition panels. In this example, when the one or more slidable partition coupling assemblies are gathered together along first track subsystem 24, the partition panels may be slackened. Modular partition track system 10 may include a partition assembly housing configured to cover the un-deployed portions of partition assembly 40. As discussed above and as the one or more slidable partition coupling assemblies are deployed along first track subsystem 24, the partition panels may expand and the partition posts may be slid out of the partition assembly housing. In some embodiments, the partition assembly housing may be positioned on an end portion of modular partition track system 10 and the first track subsystem 24 on the end portion may be generally circular to gather the partition assembly in a smaller footprint. In this manner, partition assembly 40 may "wind" into and out of the partition assembly housing as the one or more slidable partition coupling assemblies are slid along first track subsystem 24.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A modular partition track system comprising:

a modular base portion including a bottom surface with two inwardly sloped sides extending along a length of the modular base portion, wherein the two inwardly sloped sides are on opposite sides of the bottom surface and define a top surface that is narrower than the bottom surface, wherein the bottom surface of the modular base portion is configured to be positioned on a ground surface; and a first track subsystem positioned on at least a portion of the top surface of the modular base portion, the first track subsystem including one or more slidable partition coupling assemblies configured to slide along the first track subsystem, wherein the one or more slidable partition coupling assemblies receive one or more partition posts of a collapsible partition assembly, wherein the one or more slidable partition coupling assemblies are positioned adjacent to the ground surface and orient the one or more partition posts upwards vertically away from the ground surface, wherein each of the one or more slidable partition coupling assemblies of the first track subsystem receives a separate, respective partition post and slides the separate, respective partition post independently of every other partition post along the length of the modular base portion, wherein the collapsible partition assembly includes a fabric panel between each partition post.

2. The modular partition track system of claim 1, further comprising:

a second track subsystem positioned on at least a portion of a second surface of the modular base portion, the second track subsystem including one or more second slidable portions configured to slide along the second track subsystem.

3. The modular partition track system of claim 2, wherein the one or more slidable partition coupling assemblies of the first track subsystem and the one or more second slidable portions of the second track subsystem are configured to slide independently of each other.

4. The modular partition track system of claim 2, wherein the second track subsystem is positioned on a bottom surface of the modular base portion.

5. The modular partition track system of claim 2, wherein the one or more second slidable portions include one or more mounting assemblies.

6. The modular partition track system of claim 5, wherein the one or more mounting assemblies are configured to releasably engage one or more apertures formed within the ground surface.

7. The modular partition track system of claim 2, wherein the second track subsystem is configured to extend along the length of the modular base portion.

8. The modular partition track system of claim 1, wherein one or more collapsible partition panels of the collapsible partition assembly are configured to at least one of:

expand as the one or more slidable partition coupling assemblies are pulled apart from one another on the first track subsystem; and collapse as the one or more slidable partition coupling assemblies are compressed together on the first track subsystem.

9. The modular partition track system of claim 1, wherein the modular base portion is configured to be removably couplable to at least one additional modular base portion.

10. The modular partition track system of claim 9, wherein the first track subsystem of the modular base portion is configured to join with a corresponding first track subsystem of the at least one additional modular base portion when the modular base portion is coupled to the at least one additional modular base portion.

11. The modular partition track system of claim 9, further comprising:

a power transmission line within the modular base portion configured to be electrically coupled to a power transmission line within the at least one additional modular base portion, wherein the power transmission line within the modular base portion and the power transmission line within the at least one additional modular base portion are configured to transmit power along the length of the combination of the modular base portion and the at least one additional modular base portion.

12. The modular partition track system of claim 11, wherein the power transmission line within the modular base portion is configured to be electrically coupled to the one or more slidable partition coupling assemblies and configured to transmit power to one or more partition posts of a partition assembly removably coupled to the one or more slidable partition coupling assemblies.

13. The modular partition track system of claim 1, wherein the first track subsystem is configured to extend along the length of the modular base portion.

14. The modular partition track system of claim 1, further comprising:

an integrated lighting system.

15. A modular partition track system comprising:

a modular base portion including a bottom surface with two inwardly sloped sides extending along a length of the modular base portion, wherein the two inwardly sloped sides are on opposite sides of the bottom surface and define a top surface that is narrower than the bottom surface, wherein the bottom surface of the modular base portion is configured to be positioned on a ground surface;

a first track subsystem positioned on at least a portion of the top surface of the modular base portion, the first track subsystem including one or more first slidable portions configured to slide along the first track subsystem; and a second track subsystem positioned on at least a portion of the bottom surface of the modular base portion that extends along the ground surface, the second track subsystem including one or more second slidable portions configured to slide along the second track subsystem.

16. The modular partition track system of claim 15, wherein the one or more first slidable portions include one or more slidable partition coupling assemblies.

17. The modular partition track system of claim 16, wherein the one or more slidable partition coupling assemblies are configured to be removably coupled to one or more partition posts of a collapsible partition assembly.

18. The modular partition track system of claim 17, wherein the one or more slidable partition coupling assemblies include a threaded portion configured to receive a corresponding threaded sleeve portion configured to be removably coupled to a partition post of the one or more partition posts of the collapsible partition assembly.

19. The modular partition track system of claim 15, further comprising:

an integrated lighting system.

20. A modular partition track system comprising:

a modular base portion including a bottom surface with two inwardly sloped sides extending along a length of the modular base portion, wherein the two inwardly sloped sides are on opposite sides of the bottom surface and define a top surface that is narrower than the bottom surface, wherein the bottom surface of the modular base portion is configured to be positioned on a ground surface, wherein the modular base portion is configured to be removably couplable to at least one additional modular base portion;

a first track subsystem extending along the length of the top surface of the modular base portion, the first track subsystem including one or more slidable partition coupling assemblies configured to slide along the first track subsystem; and a second track subsystem extending along the length of the bottom surface of the modular base portion that extends along the ground surface, the second track subsystem including one or more second mounting assemblies configured to slide along the second track subsystem, a power transmission line within the modular base portion configured to be electrically coupled to a power transmission line within the at least one additional modular base portion, wherein the power transmission line within the modular base portion and the power transmission line within the at least one additional modular base portion are configured to transmit power along the length of the combination of the modular base portion and the at least one additional modular base portion;

wherein the one or more slidable partition coupling assemblies are configured to be releasably coupled to one or more partition posts of a collapsible partition assembly, wherein the one or more slidable partition coupling assemblies are positioned adjacent to the ground surface and orient the one or more partition posts upwards vertically away from the ground surface.

* * * * *